INVENTOR
Karl M. Yost
ATTORNEYS

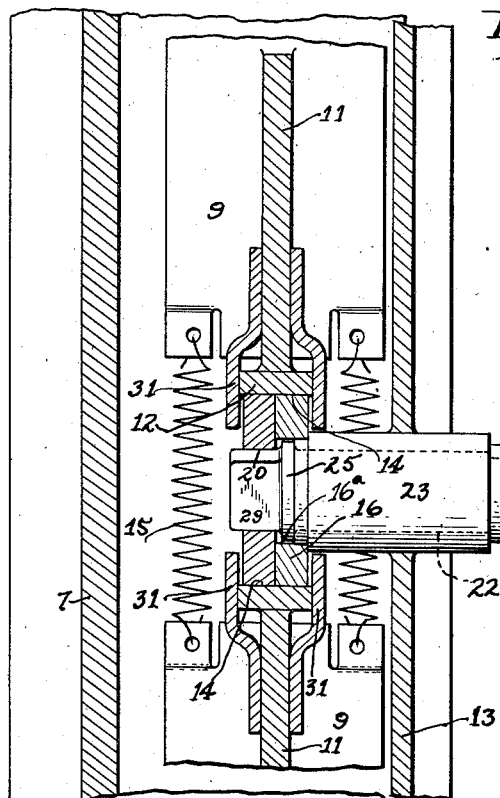
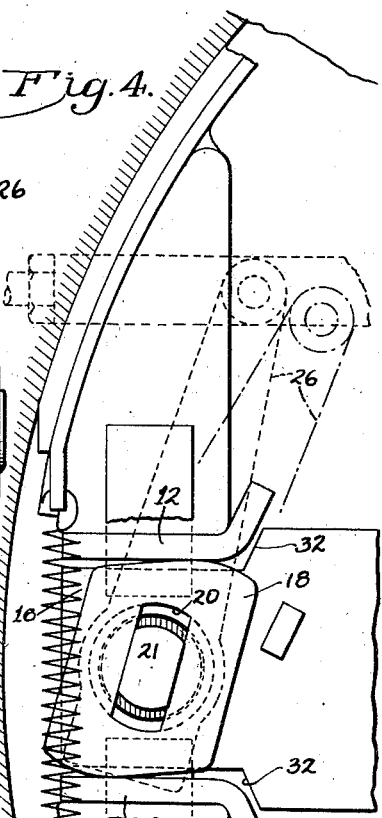
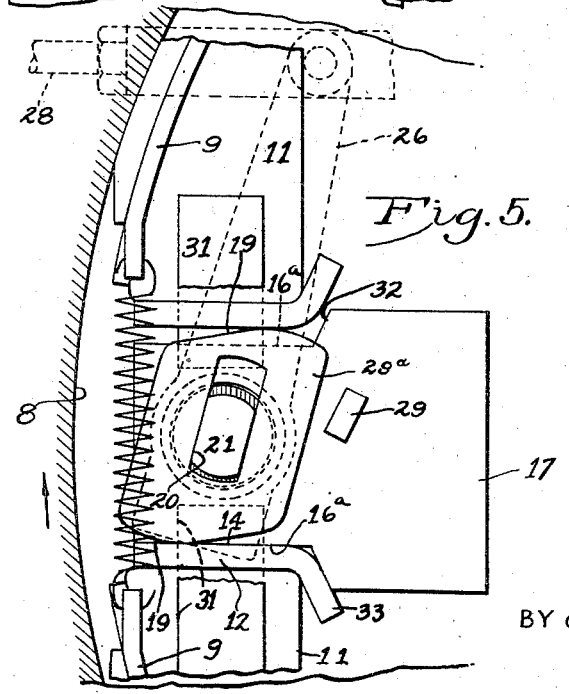

Patented Aug. 19, 1947

2,426,135

UNITED STATES PATENT OFFICE 2,426,135

BRAKE

Karl M. Yost, Beloit, Wis., assignor to Warner Electric Brake Manufacturing Company, Beloit, Wis., a corporation of Illinois Application April 21, 1944, Serial No. 532,048

3 Claims. (Cl. 188—78)

This invention relates generally to friction brakes such as are used on vehicles, and the primary object is to provide a brake of the above character which is composed largely of sheet metal stampings which may be assembled simply and conveniently and which, in spite of its low cost, will operate reliably through long periods of service use.

Another object is to provide a novel friction brake of the multiple shoe type having actuators which are interconnected to insure equal expansion of each pair of shoe ends.

The invention also resides in the novel manner of holding the shoe ends in proper relation to the drum and expanding devices.

Figure 1:
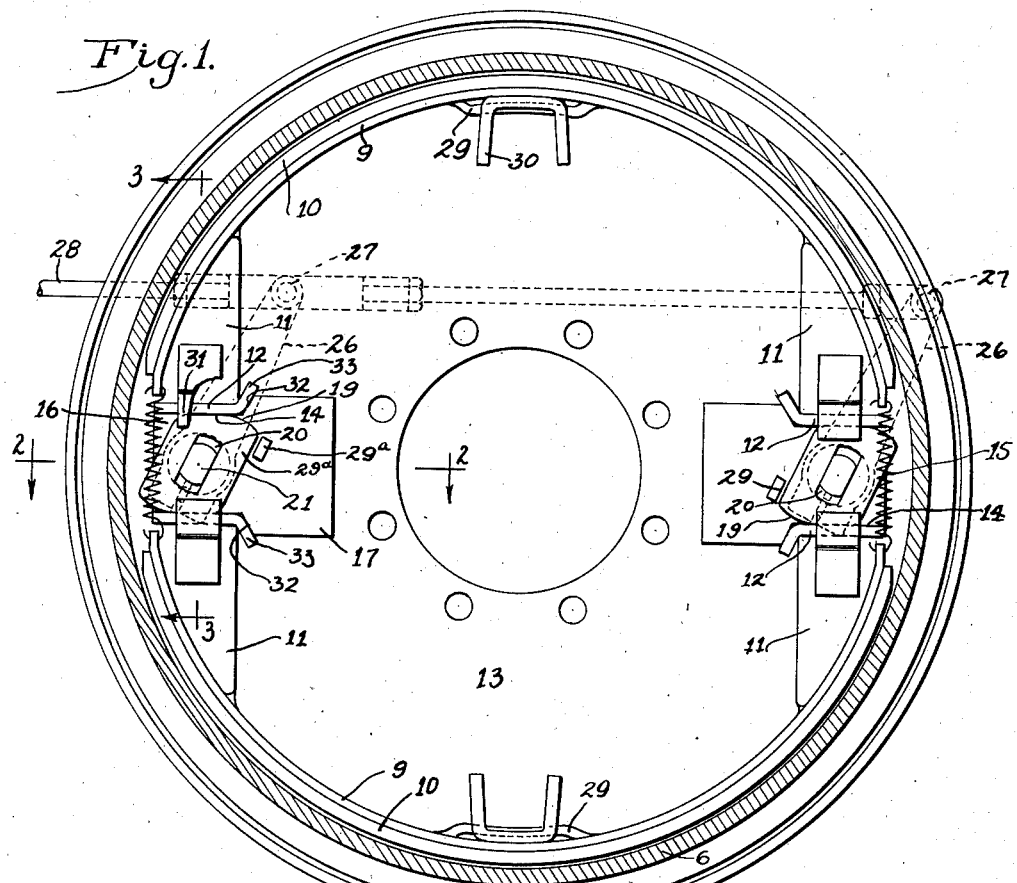
Figure 2:
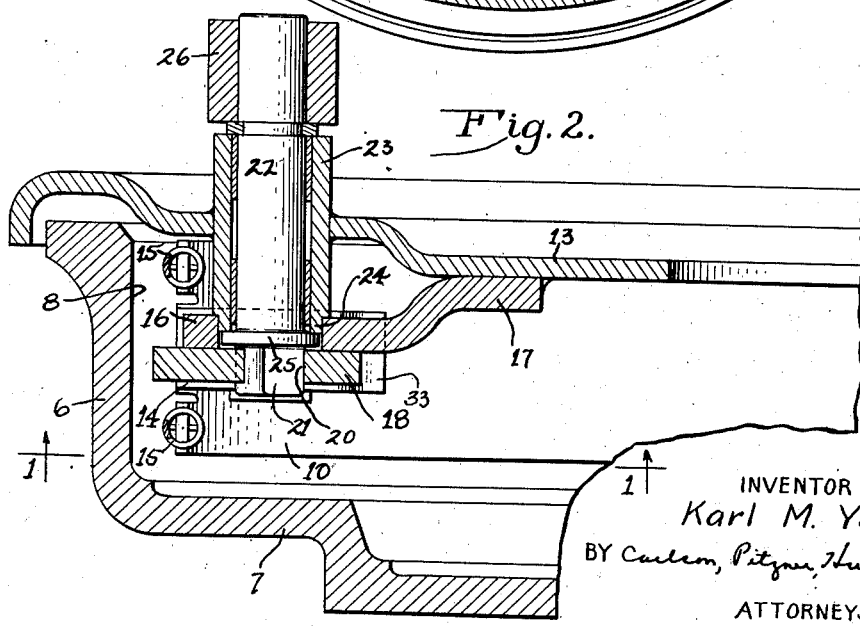

Other objects and advantages of the invention will become apparent from the following detailed description taken in connection with the accompanying drawings, in which Figure 1 is a sectional view of a brake embodying the novel features of the present invention, the section being taken substantially along the line 1—1 of Fig. 2.

Figs. 2 and 3 are fragmentary sections taken respectively along the lines 2—2 and 3—3 of Fig. 1.

Figs. 4 and 5 are fragmentary views showing different positions of the parts.

The brake shown for purposes of illustration is of the internal expanding type having a drum 6 with an inturned flange 7 bolted to the vehicle wheel or other part to be braked and having an internal cylindrical surface 8. The open end of the drum is closed by a pressed metal plate 13 secured to a nonrotatable part of the vehicle. Arranged end to end within the drum for gripping engagement with the internal surface 8 are two semi-circular shoes 9 having friction coverings 10 and reinforced at their end portions by central ribs 11 to which are welded flat strips 12 that provide opposed parallel abutment surfaces 14. Two contractile springs 15 stretched between the shoe ends draw the surfaces 14 against opposite side faces 16ª of an anchor 16 which is the squared outer end of a piece of sheet metal bent intermediate its ends to offset the inner end 17. The latter is welded to the inner surface of the plate 13 and, by virtue of the offset, the anchor 16 is located closely adjacent the center plane of the shoes 9.

Expansion of the shoes is effected by flat cams 18 lying against the side of the anchor so that their surfaces 19 are engageable with the shoe abutments 14. Each cam has a longitudinal slot 20 receiving the flattened inner ends 21 of a rock shaft 22 which is journaled in a sleeve 23 projecting through and welded in the plate 13 with its reduced inner end 24 received in a hole in the anchor 16. A flange 25 on the shaft abuts against the inner end of the sleeve. The slot 20 is longer than the flattened shaft end 21 so that the cam is adapted to shift edgewise relative to the shaft and permit one shoe end or the other to come against the anchor under the self-energizing force applied to the shoe when the rotating drum surface is contacted after initial spreading of the shoe ends.

The cams 18 are set so that in the released position shown in Fig. 1, their slots 20 will be inclined relative to a chord of the drum perpendicular to a drum radius through the cam axis, and, in applying the brake, the cams are always turned counterclockwise so as to reduce this inclination. This is accomplished in the present instance by cranks 26 fixed to the outer ends of the shafts 22 and pivotally connected at their outer ends 27 to an actuating rod 28. The intervening portion of the rod is of such length that corresponding radii of the two cams closely parallel each other in all actuated positions of the cams. As a result, the pairs of shoe ends are expanded equally, and wear on the shoe surfaces is equalized. The return movement of the cams and actuating linkages is limited by stops 29ª rigid with the anchor 16 and engageable with the sides of the cams in the brake-released position of the actuator.

The shoes are centered axially of the drum by struck out ribs 29 at the shoe centers received in circumferential slots in members 30 welded to the plate 13. At their ends, parallel plates 31 welded to opposite sides of each rib 11 project beyond the abutments 12 and lie adjacent the sides of the anchor 16 and cam 18. The shoe ends are thus centered, and the cams are held on the shaft ends 21. Positioning of the shoe ends radially is effected by inclined shoulders 32 formed on opposite sides of the anchor plate 16 and coacting with complemental inwardly flaring flanges 33 formed by bending apart the ends of the abutment pieces 12 which project inwardly beyond the ribs 11.

The operation of the brake is illustrated in Figs. 1, 4, and 5, assuming that the drum is rotating clockwise. Shifting of the actuating rod 28 to the left turns both cams 18 counterclockwise moving all four end faces 14 of the shoes away from their anchors as shown in Fig. 4. When the drum is engaged by the shoes, forces derived frictionally are exerted by the drum on the shoes to move the latter in the direction of drum rotation until one end of each shoe comes against its anchor as shown in Fig. 5. Such circumferential shifting of the shoes and edgewise shifting of the cams 18 is permitted by the slot 20 which, it will be observed, are inclined only slightly away from chords of the drums. When the actuating rod 28 is released, the springs 15 return the shoes and shift the cams back to the released positions shown in Fig. 1.

It will be observed that the parts of the improved brake are largely sheet metal stampings and of simple constructions. They may be assembled easily to form a brake which may be manufactured at low cost and yet is durable and reliable in operation and equally effective in either direction of drum rotation.

I claim as my invention:

1. A friction brake having, in combination, a pair of shoes adapted for engagement with the internal surface of a drum and providing pairs of parallel ends circumferentially spaced apart, anchors disposed between said ends and having flat side faces adapted for abutment therewith, spring means for contracting said shoe ends against said anchor faces, means for spreading said shoe ends apart to apply the brake, radially flaring surfaces on each of said anchors adjacent said faces, and complemental flaring projections on said shoe ends coacting with said anchor surfaces during contraction of said shoes to center the shoe ends radially with respect to said anchor faces.

2. A friction brake having, in combination, an annular friction element having a pair of parallel ends circumferentially spaced apart, an anchor disposed between said ends and having flat side faces adapted for abutment therewith, spring means for contracting said ends against said anchor faces, means for spreading said ends apart to expand said element, radially flaring surfaces on said anchor adjacent said faces, and complementary flaring projections on said element ends coacting with said anchor surfaces during contraction of said element to center said ends radially with respect to said anchor faces.

3. A friction brake mechanism having, in combination, an annular friction element having circumferentially separable ends, a plate disposed perpendicular to the axis of said element, a member bent intermediate its end portions to offset the latter, one of said end portions being secured to the inner surface of said plate and the other end portion being spaced from said plate and projecting radially in between said ends to provide an abutment anchor for the latter, a rotary shaft projecting through and supported by said plate and said other end portion of said member, means on said shaft lying adjacent said anchor member and operable when turned away from brake-released position to move one or the other of said ends away from its anchor, and two pairs of coacting cam surfaces respectively formed on said member and said element ends and engageable in the return of said ends into abutment with said anchor to position the ends radially with respect to the axis of said element.

KARL M. YOST.

REFERENCES CITED

The following references are of record in the file of this patent:

UNITED STATES PATENTS

| Number | Name | Date |
| --- | --- | --- |
| 920,643 | Pfander | May 4, 1909 |
| 1,756,983 | LaBrie | May 6, 1930 |
| 2,131,613 | Chase et al. | Sept. 27, 1938 |
| 866,328 | Brush | Sept. 17, 1907 |
| 1,928,081 | Van Buskirk | Sept. 26, 1933 |
| 1,852,121 | LaBrie | Apr. 5, 1932 |
| 1,907,983 | Kohr et al. | May 9, 1933 |